[19] United States Patent
Cady et al.

(10) Patent No.: US 10,953,353 B2
(45) Date of Patent: Mar. 23, 2021

(54) PERFORATED FOIL SCREEN ASSEMBLY

(71) Applicant: M-I L.L.C., Houston, TX (US)

(72) Inventors: Eric Cady, Walton, KY (US); Richard Bingham, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 139 days.

(21) Appl. No.: 15/747,145

(22) PCT Filed: Jul. 25, 2016

(86) PCT No.: PCT/US2016/043792
§ 371 (c)(1),
(2) Date: Jan. 23, 2018

(87) PCT Pub. No.: WO2017/019580
PCT Pub. Date: Feb. 2, 2017

(65) Prior Publication Data
US 2018/0214798 A1 Aug. 2, 2018

Related U.S. Application Data

(60) Provisional application No. 62/196,443, filed on Jul. 24, 2015.

(51) Int. Cl.
*B01D 29/05* (2006.01)
*B07B 1/46* (2006.01)
(Continued)

(52) U.S. Cl.
CPC ............ *B01D 29/05* (2013.01); *B01D 21/283* (2013.01); *B01D 29/56* (2013.01); *B01D 39/12* (2013.01); *B07B 1/469* (2013.01); *E21B 21/065* (2013.01)

(58) Field of Classification Search
CPC ........ B01D 29/05; B01D 29/56; B01D 39/12; B01D 21/283; E21B 21/065; B07B 1/46; B07B 1/469
See application file for complete search history.

(56) References Cited

U.S. PATENT DOCUMENTS 1,685,085 A * 9/1928 Hoyt .................... D21C 9/18
162/274
2,315,651 A * 4/1943 Peterson ............... B07B 1/4636
209/398
(Continued)

FOREIGN PATENT DOCUMENTS

WO 2008/072002 A1 6/2008

OTHER PUBLICATIONS

International Preliminary Report on Patentability for the equivalent International patent application PCT/US2016/043792 dated Feb. 8, 2018.
(Continued)

*Primary Examiner* — Liam Royce

(57) ABSTRACT

A screen assembly includes a frame having an outer perimeter and at least one inner support member, and at least one smooth surface affixed to the frame, where the smooth surface(s) have perforations. The frame may include a plurality of contact points extending upward from a top surface, and at least one smooth perforated screening surface is affixed to the plurality of contact points on the frame. In some cases the smooth surface comprises a perforated region and an erosion resistant region. Also, the perforations may have a shape that includes one or more corners. The smooth surface may be a perforated metal foil, sheet metal, and the like. Perforations may be apertures having one or more opening area sizes across the span of the screen assembly.

7 Claims, 10 Drawing Sheets

(51) Int. Cl.
    *B01D 21/28*     (2006.01)
    *B01D 29/56*     (2006.01)
    *B01D 39/12*     (2006.01)
    *E21B 21/06*     (2006.01)

(56) References Cited

U.S. PATENT DOCUMENTS

| | | |
|---|---|---|
| 5,598,930 A | 2/1997 | Leone et al. |
| 5,636,749 A | 6/1997 | Wojciechowski |
| 6,283,302 B1 * | 9/2001 | Schulte ................ B01D 29/012 |
| | | 209/399 |
| 6,371,301 B1 * | 4/2002 | Schulte ................ B01D 33/033 |
| | | 209/405 |
| 7,909,170 B2 | 3/2011 | Jones et al. |
| 8,393,474 B2 | 3/2013 | Robertson |
| 2004/0245154 A1 | 12/2004 | Baltzer et al. |
| 2007/0125687 A1 | 6/2007 | Kutryk |
| 2011/0198269 A1 | 8/2011 | Young et al. |
| 2013/0074310 A1 | 3/2013 | Smith |
| 2013/0319955 A1 * | 12/2013 | Bailey ...................... B07B 1/46 |
| | | 210/780 |
| 2014/0042078 A1 * | 2/2014 | Hwang .............. B01D 29/0077 |
| | | 210/413 |
| 2014/0183143 A1 | 7/2014 | Cady et al. |

OTHER PUBLICATIONS

International Search Report and Written Opinion for the equivalent International patent application PCT/US2016/043792 dated Nov. 3, 2016.

* cited by examiner

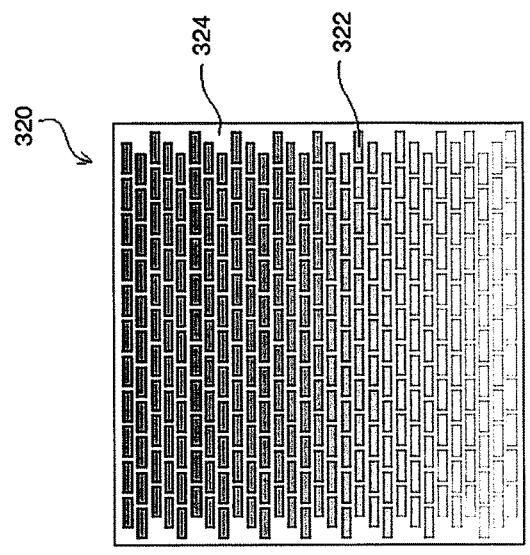
FIG. 3A
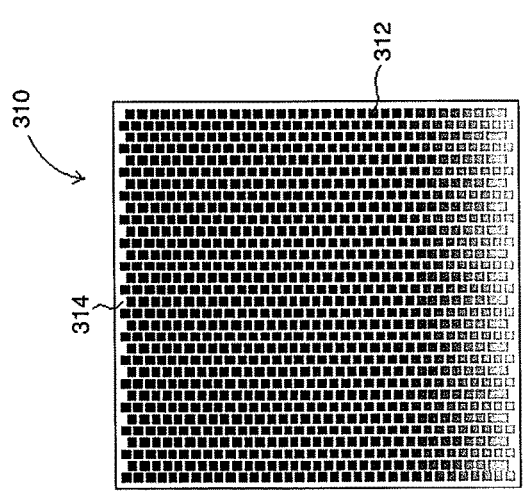
FIG. 3B
FIG. 3C
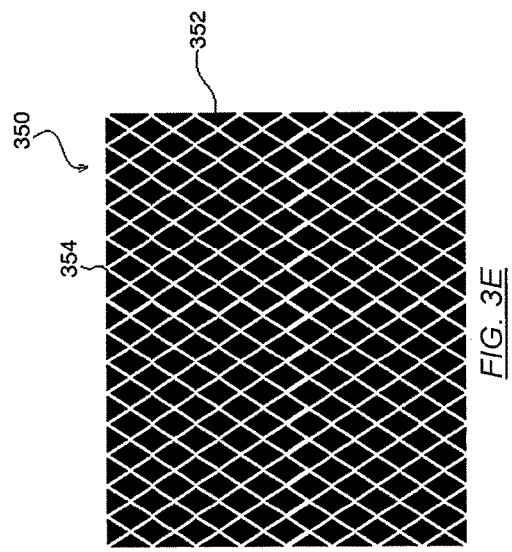
FIG. 3D
FIG. 3E

PERFORATED FOIL SCREEN ASSEMBLY

CROSS-REFERENCE TO RELATED APPLICATION

The present document is based on and claims priority to U.S. Provisional Application Ser. No.: 62/196,443, filed Jul. 24, 2015, which is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drill string. Once the mud reaches the drill bit, it exits through various nozzles and ports where it lubricates and cools the drill bit. After exiting through the nozzles, the "spent" fluid returns to the surface through an annulus formed between the drill string and the drilled wellbore.

A significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drill string and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus to remove cuttings and other solid particulates from drilling mud are commonly referred to in the industry as "shale shakers." A shale shaker, also known as a vibratory separator, is a vibrating sieve-like table upon which returning dirty drilling mud is deposited and through which clean drilling mud emerges. Typically, the shale shaker is an angled bed of mesh screens to filter the drilling mud. Returning drilling mud is deposited at the top of the shale shaker. As the drilling mud travels across the mesh screens, the fluid falls through apertures in the mesh screens to a reservoir below leaving the solid particulate material behind. The combination of the angle of inclination with the vibrating action of the shale shaker table enables the solid particles to be conveyed to the discharge end of the shaker table.

Because shale shakers are typically in continuous use during drilling operations, any repairs and associated downtimes are to be minimized as much as possible. Often, the mesh screens of shale shakers, through which the solids are separated from the drilling mud, wear out over time and need replacement. Therefore, shale shaker screens are typically constructed to be removed and replaced. While there are numerous styles and sizes of shaker screens, typically, shaker screens include a wire mesh on a frame that provides structural support and allows the passage of fluids therethrough. The size of apertures in the wire mesh defines the largest solid particle capable of passing therethrough.

Accordingly, there is a recognized need for shaker screen designs with improved resiliency and durability.

All U.S. patents and applications and all other published documents mentioned anywhere in this application are incorporated herein by reference in their entirety.

Without limiting the scope of the disclosure, a brief summary of some of the claimed embodiments of the disclosure is set forth below. Additional details of the summarized embodiments of the disclosure and/or additional embodiments may be found in the Detailed Description below.

A brief abstract of the technical disclosure in the specification is provided as well, only for the purposes of complying with 37 C.F.R. 1.72. The abstract is not intended to be used for interpreting the scope of the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIGS. 3A through 3E illustrate some examples of perforations in smooth screening surfaces, which have at least one corner, according to the disclosure, in a top view;

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
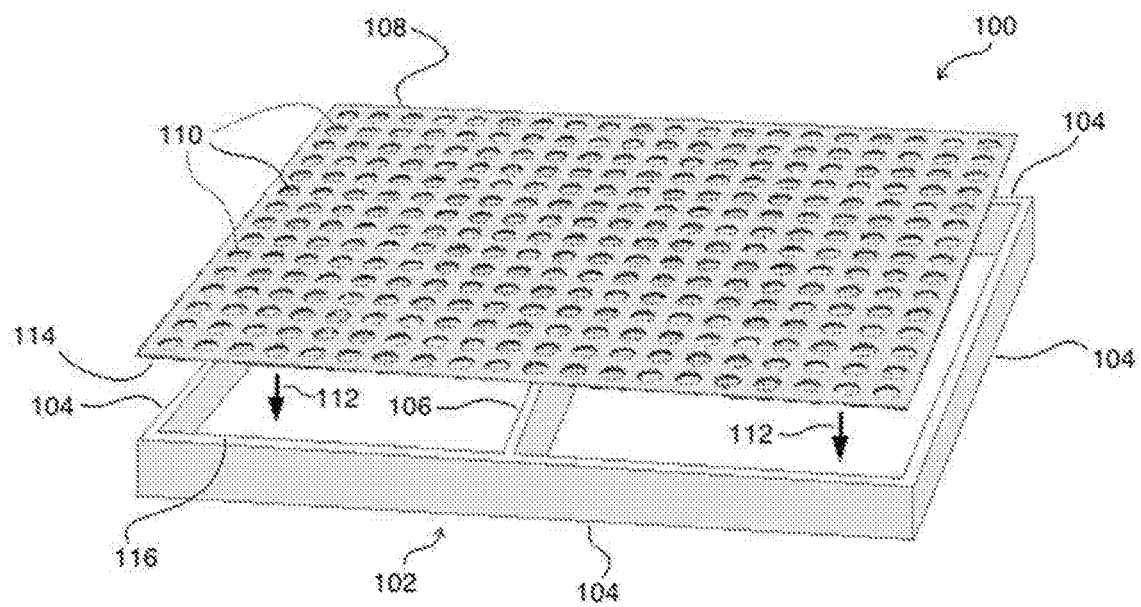
FIG. 1 illustrates a screen assembly according to a first aspect of the disclosure, in a perspective view.

FIG. 1 illustrates a screen assembly according to a first aspect of the disclosure, in a perspective view. Screen assembly 100 generally includes a frame 102 having an outer perimeter 104 and at least one inner support member 106. At least one filtering surface 108 is affixed to frame 102, and the filtering surface 108 may have a plurality of perforations 110 there through for allowing fluid and particles smaller in dimension than perforations 110 to pass through the perforations 110 and through frame 102, thus enabling separation of solids larger in dimension than perforations 110 from the fluid and smaller particles. Utilizing a filtering surface 108 with perforations 110 greatly reduces the frequency at which solid particles are caught in the openings of a screen. Also, the perforations 110 of the filtering surface 108 do not flex within the vibrational environment induced by shale shaker motions, to the degree the openings of traditional mesh screens are known to flex. The filtering surface 108 may be affixed to frame 102, as indicated by arrows 112, where underside 114 of the filtering surface 108 is attached to upper surfaces 116 of frame 102. The underside 114 of filtering surface 108 may be affixed (permanently or temporarily) to frame 102 by any suitable technique, including, but not limited to, welding, adhesive bonding, hardware fastener, crimping, cementing, and the like.

Perforations 110, or perforations of any screen embodiments according to the disclosure, may be of any suitable size. The perforations 110 may be uniform in size, or cut point, over the area of the smooth surface in some cases, while in other cases, the perforation size may be non-uniform over the area of the surface. Cut point is the particle size at which 100% of the particles larger than the $d_{100}$ separation are retained by the screen assembly 100, and while not necessarily a performance indicator, cut point is used to characterize openings of the screen perforations. Some exemplary cut points (otherwise referred to as $d_{100}$ separation in μm—or—API number) are provided in Table 1 below. In some embodiments, the perforations 110 have a cut point of between 1 μm and 5000 μm, but may be in a range of 18.5 μm to 3700 μm, or any range within those broader ranges. The perforations 110 can allow fluid to pass through and prevent rigid particles from becoming lodged in the perforations 110 and blinding the screen assembly 100. The perforations 110 shown in FIG. 1 are shown in a dimension to illustrate some embodiments of the disclosure, but are not limiting to the large breadth of perforation sizes within the scope of the disclosure.

TABLE 1

| $d_{100}$ separation μm | API Screen number |
| --- | --- |
| >3075.0 to 3675.0 | API 6 |
| >2580.0 to 3075.0 | API 7 |
| >2180.0 to 2580.0 | API 8 |
| >1850.0 to 2180.0 | API 10 |
| >1550.0 to 1850.0 | API 12 |
| >1290 to 1550.0 | API 14 |
| >1090 to 1290.0 | API 16 |
| >925.0 to 1090.0 | API 18 |
| >780.0 to 925.0 | API 20 |
| >655.0 to 780.0 | API 25 |
| >550.0 to 655.0 | API 30 |
| >462.5 to 550.0 | API 35 |
| >390.0 to 462.5 | API 40 |
| >327.5 to 390.0 | API 45 |
| >275.0 to 327.5 | API 50 |
| >231.0 to 275.0 | API 60 |
| >196.0 to 231.0 | API 70 |
| >165.0 to 196.0 | API 80 |
| >137.5 to 165.0 | API 100 |
| >116.5 to 137.5 | API 120 |
| >98.0 to 116.5 | API 140 |
| >82.5 to 98.0 | API 170 |
| >69.0 to 82.5 | API 200 |
| >58.0 to 69.0 | API 230 |
| >49.0 to 58.0 | API 270 |
| >41.5 to 49.0 | API 325 |
| >35.0 to 41.5 | API 400 |
| >28.5 to 35.0 | API 450 |
| >22.5 to 28.5 | API 500 |
| >18.5 to 22.5 | API 635 |

Figure 2:
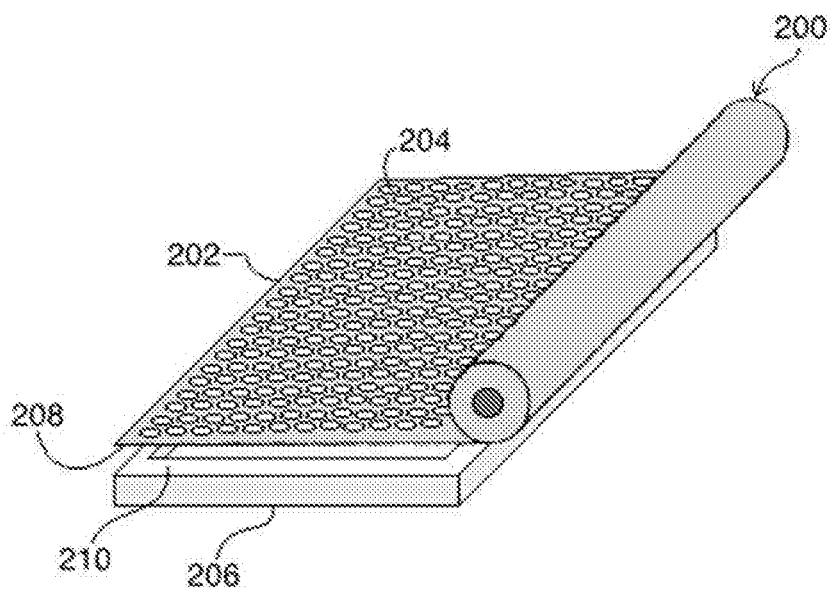
FIG. 2 depicts a perforated metal foil may be useful to provide a smooth surface for affixing to a screen frame, according to an aspect of the disclosure, in a perspective view.

Typical woven wire mesh screen surfaces have apertures formed by intersecting wires, or "knuckles", as a result of the weaving process where wire filaments cross over, which in some applications interfere with conveyance of solids. The knuckles give a rough surface upon which solids may be trapped, as well as having a rough surface which interferes with solids sliding, and thus is hindering solids conveyance across the surface of the screen. Eliminating knuckles may also extend screen life, since the intersecting wires of the knuckles may also be prone to abrasion by solids, such as drill cuttings. These worn knuckles become weak points leading to mesh failure. The screen assemblies according to the disclosure provide the filtering surface 108 without knuckles and without intersecting wires which allows solids to slide along the surface of the screen assembly 100, as well as not trapping solids in the intersecting wires or knuckles. The filtering surface 108 of the screen assembly 100 may be planar, as shown in FIG. 1, multi-planar as shown below, smooth while undulated as shown below, or have any suitable surface profile. The material forming the filtering surface 108 is a perforated structure, at least adequately durable for handling slurries of fluid laden with earthen solids materials. The filtering surface 108 may be a perforated plate which is made of aluminum, stainless steel, bronze, brass, titanium, monel or other metal alloy, and may be provided as perforated sheet metal, or a foil, such as that depicted in FIG. 2. Any suitable thickness of the perforated structure may be useful which forms a sufficiently resilient and durable screening smooth surface. Referring to FIG. 2, perforated metal foil 200 may be useful to provide the filtering surface 108 for affixing to the frame. A portion 202 of perforated metal foil 200 which includes perforations 204, may be laid out over frame 206 and affixed thereto, to form the filtering surface 108 of a screen assembly 100. The smooth surface 202 may be affixed to frame 206 where underside 208 of smooth surface 202 is attached to upper surfaces 210 of frame 206. After affixing, foil roll 200 may be cut away from portion 202.

Screen assemblies 100 according to the disclosure may be of any suitable configuration, including hook strip type, pre-tensioned (rigid frame), and the like. A distinction between the two types of screen assemblies mentioned is that the hook strip type has mesh or wires that are not fully tensioned until they are attached to the shaker while the pre-tensioned type has mesh or wires that are in tension before the screen is attached to the shaker.

In some embodiments, the filtering surface 108 may be removable from the frame 102. In this manner, the filtering surface 108 may be replaced in the event that the filtering surface 108 becomes damaged, worn, or for other suitable reasons. The frame 102 may be reusable after removing the filtering surface 108. A replacement filtering surface 108 may be affixed to the frame 102 after a damaged filtering surface 108 is removed from the frame 102. This extends the life of frame 102 even if the filtering surface 108 is damaged.

In some embodiments, perforations in the filtering surface 108 may be a shape that is ovate, elliptical, circular, round slot end, or any other shape without corners, such as perforations 110 and 204 shown in FIGS. 1 and 2. In other embodiments, the perforations 110, 204 may be a shape which includes one or more corners such as, but not limited to, droplet, triangular, square, rectangular, diamond, rhombic, pentagonal, hexagonal, octagonal, straight square slot shapes, and the like. FIGS. 3A through 3E illustrate some examples of the perforations 110, 204 whereby the filtering surface 108 has no knuckle portions or wire intersections such that it is a rather smooth surface. In FIG. 3A, a filtering surface 300 is shown with drop shaped perforations 302 through smooth contiguous surface 304, and one corner 306 is included in the drop shape. FIG. 3B depicts a perforated smooth surface 310 with square shaped perforations 312 through smooth contiguous surface 314. FIG. 3C illustrates a perforated smooth surface 320 with rectangular shaped perforations 322 through smooth contiguous surface 324. FIG. 3D depicts a perforated smooth surface 330 with diamond shaped perforations 332 through smooth contiguous surface 334. FIG. 3E illustrates a perforated smooth surface 350 with rectangular shaped perforations 352 through smooth contiguous surface 354.

In embodiments of the disclosure, perforations may be created through the material forming the smooth surface by any technique readily known to those of skill in the art, including laser drilling, chemical etching, electrical discharge machining, waterjet cutting, punching, stamping, pre-perforating expanding metal, three dimensional printing, and the like. Perforations in the smooth surface may be in any suitable pattern, such as straight patterns, staggered patterns, varied patterns, size gradient patterns, combinations thereof, and the like. In some aspects, perforations aligned in staggered or nested orientation provide minimal screen blinding area, and thus the highest open area, particularly in comparison with traditional mesh screens. In a straight pattern, perforations may be aligned in straight rows and columns. The smooth surfaces may include other features such as margins where the area on the sides, ends, or inside of the perforated sheet is without perforations, or safe side margins where the perforations continue all the way up to the edge but not on or over the edge.

Figure 4:
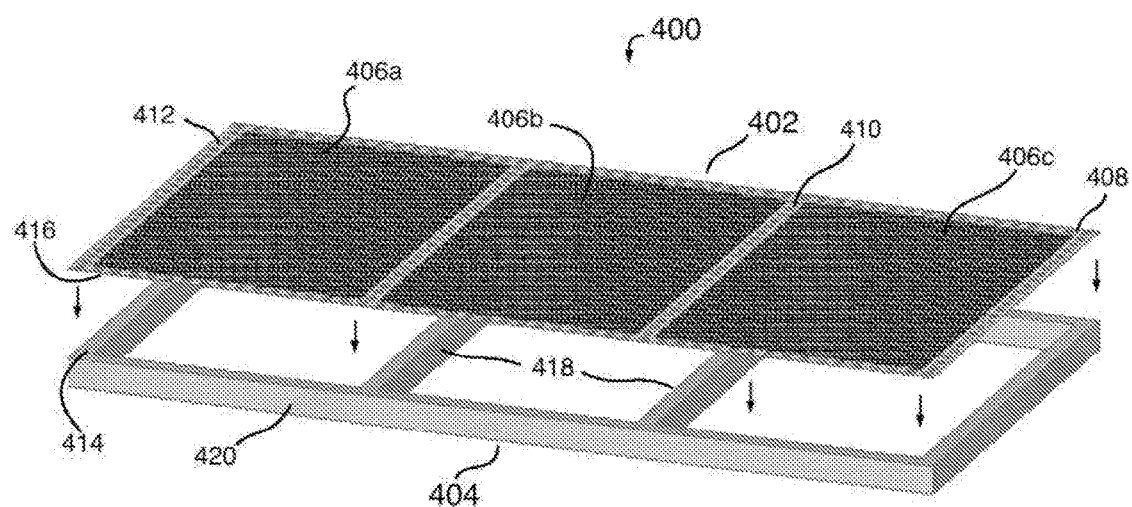
FIGS. 4 and 5 graphically represent other screen assembly embodiments according to some aspects of the disclosure, in a perspective view.

Now referencing FIG. 4, which illustrates another screen assembly embodiment according to another aspect of the disclosure, in a perspective view. Screen assembly 400 includes a surface 402 affixed to frame 404, and the surface 402 includes perforated portions 406a, 406b and 406c (collectively 406). The surface 402 may be relatively flat and smooth such that solids, such as drill cuttings will not contact or become stuck within the perforated portions 406a, 406b, 406c and/or degrade the edges and corners of the perforated portions 406a, 406b, 406c. The surface 402 further includes side margins 408 around the perimeter and inside margins 410 (two shown), and the side margin 408 and inside margin 410 include holes 412 for affixing surface 414 with smooth surface underside 416. In some aspects, material such as epoxy, polypropylene or other suitable adhesive flows through holes 412 and rigidly affixes the perforated smooth surface with frame 404. Frame 404 includes inner support members 418 and an outer perimeter 420 collectively defining surface 414.

Figure 5:
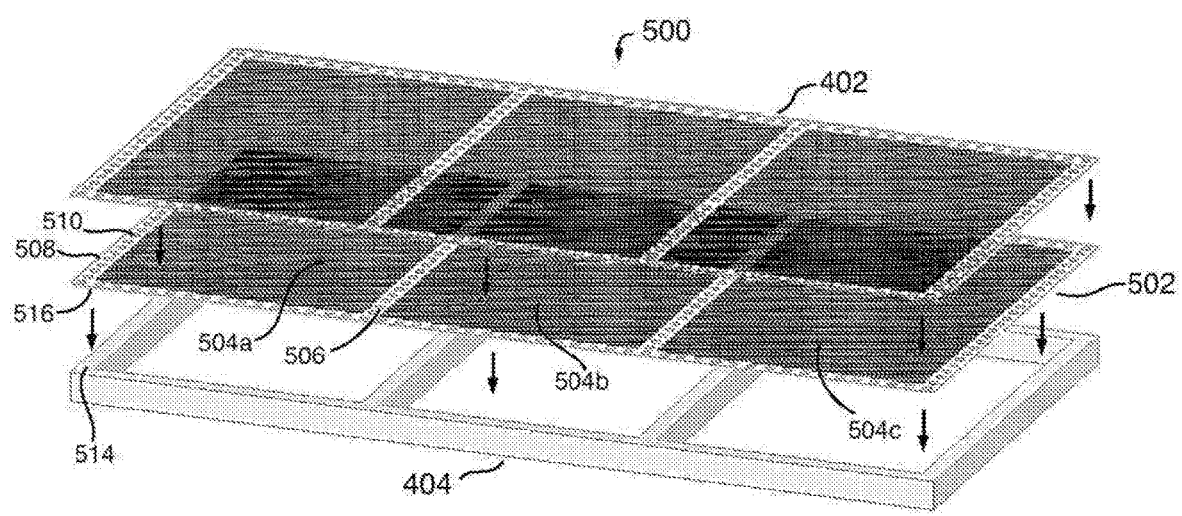

FIG. 5 depicts yet another screen assembly embodiment according to another aspect of the disclosure, in a perspective view. Screen assembly 500 generally includes like elements as screen assembly 400 in FIG. 4, such as a surface 402 affixed to frame 404, where the surface 402 includes perforated portions, side margins, inside margins, and the side and inside margins include holes 412 for affixing. Frame 404 may include inner support members and an outer perimeter, which define a surface 516. Screen assembly 500 further includes an intermediate perforated layer 502, which includes perforated portions 504a, 504b and 504c, as well as inside margins 506 (two shown) and side margins 508 around the perimeter. The side and inside margins include holes 510 for affixing surface 514 with intermediate perforated layer 516 and underside of surface 402. In an embodiment, the surface 402 may be smooth such that solids, such as drill cuttings larger than the perforated portions 504a, 504b, 504c can easily be conveyed across the screen assembly 400 without degrading the perforated portions 504a, 504b, 504c and/or becoming lodged in the perforated portions 504a, 504b, 504c.

In some embodiments, as shown in FIG. 5, separating the slurry laden with drill cuttings into drill cuttings and fluid having at least some smaller particulates can be performed using a perforated surface 402 and the intermediate perforated layer 502. When placed on the perforated surface 402, the slurry laden with drill cuttings can be vibrated by vibration of the screen assembly 500 such that the larger drill cutting material remains on the upper surface of the perforated surface 402 until it is conveyed off of the surface. Finer particulate material and fluid can pass through perforations of the perforated surface 402 and onto intermediate perforated layer 502 where blinding of the screen is not as likely because of the diminished amount or larger drill cutting material. Further, use of the combination of the perforated surface 402 and the intermediate perforated layer 502 in the screen assembly 500 provides improved durability and usable lifetime.

Figure 6A:
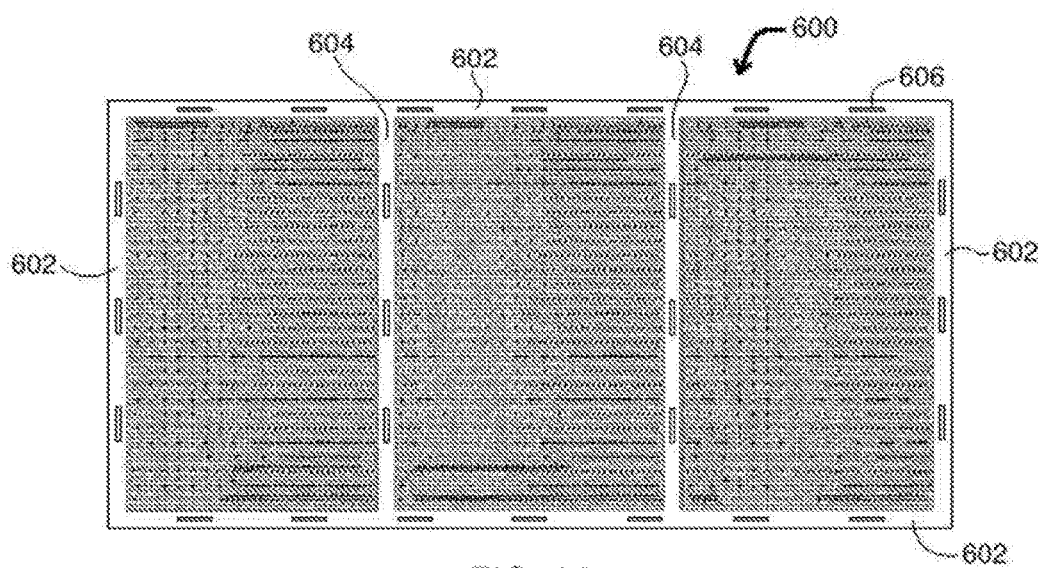
FIGS. 6A through 6C illustrate perforated smooth surface screens with side margins disposed around the perimeter and inside margins having various shaped holes for affixing screen assembly surfaces to frames, according to the disclosure, in a top view.
Figure 6B:
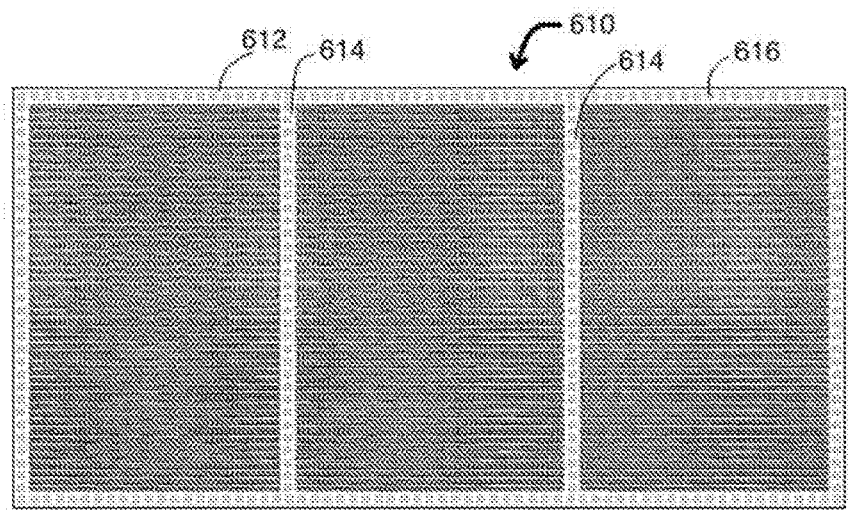
Figure 6C:
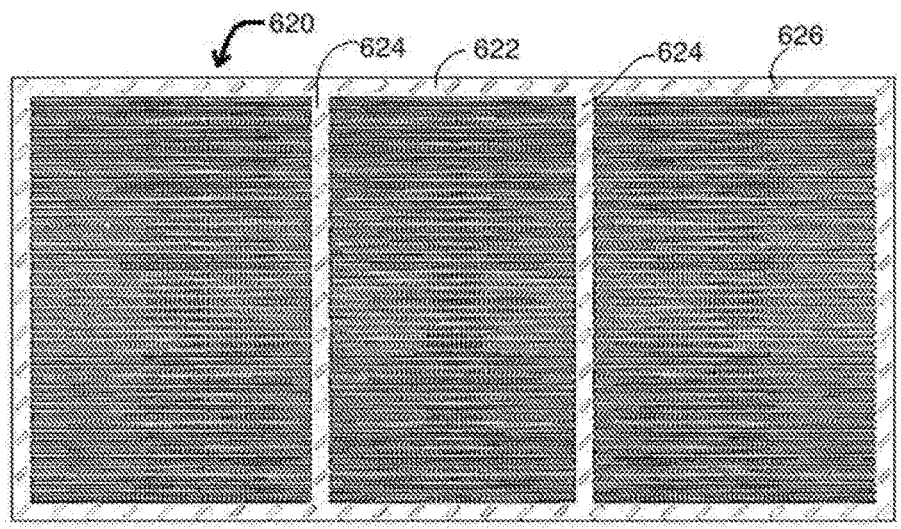

In FIGS. 4 and 5, the perforated surface 402 and the intermediate perforated layer 502 include side margins and inside margins having holes 412 and 510 for affixing to surface 516 of the frame 404. Although the holes 412 and 510 are depicts as circle shaped, the holes 412 may be any suitable shape for affixing. FIGS. 6A through 6C illustrate some examples of other suitable hole shapes. In FIG. 6A, a perforated surface or intermediate perforated layer 600 is shown with side margins 602 and inside margins 604 having slot shaped holes 606 (twenty six shown) for affixing to the surface 516 of the frame 404. FIG. 6B depicts a perforated surface or intermediate perforated layer 610 with side margins 612 disposed around the perimeter and inside margins 614, each having square shaped holes 616 for affixing to the surface of a frame. FIG. 6C illustrates a perforated surface or intermediate perforated layer 620 with side margins 622 disposed around the perimeter and inside margins 624, each having angled slot shaped holes 626 for affixing to the surface of a frame. While a specific number of holes in the margins for affixing to a frame are shown in FIGS. 6A-6C, the number of holes is not limiting, and it is within the spirit and scope of the disclosure to use any practical number of holes disposed on the margins. In an embodiment, the surfaces 600, 610, 620 may be smooth such that solids can convey without degrading or blinding the screen as previously mentioned.

Figure 7A:
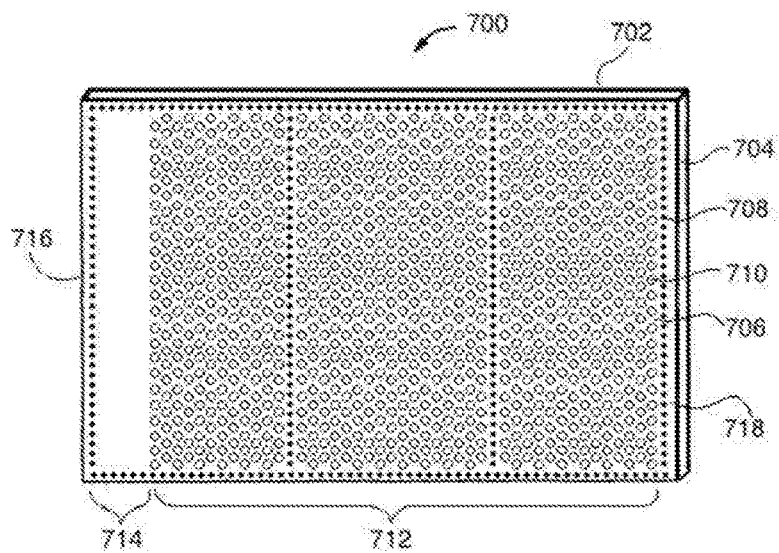
FIGS. 7A through 7C depict screen assemblies having a perforated region and an erosion resistant region, according to some aspects of the disclosure, in a perspective view.

Now referencing FIG. 7A, in some embodiments of the disclosure, screen assemblies include a perforated region and an erosion resistant region. As depicted in FIG. 7A, a screen assembly includes a frame 702 having an outer perimeter 704 and at least one inner support member (not shown), and a smooth surface 706 affixed to the frame through holes 708. The smooth surface includes perforations 710 in perforated region 712, and an erosion resistant region 714, which is essentially without perforations or has lower perforation density. In operation, slurry laden with drill cuttings is introduced upon the smooth surface 706 at erosion resistant region 714 from end 716 of screen assembly 700. As the drill cuttings laden slurry conveys across the smooth surface 706 and onto perforated region 712, the slurry is separated into drill cuttings and fluid (which may include smaller particulates). The fluid passes through the perforations 710, while the drill cuttings continue conveying across smooth surface 706, and then discharge the screen assembly at end 718. The erosion resistant region, or otherwise "high wear" area, of smooth surface 706 where material is fed onto the screen assembly enables increased screen assembly useable life.

Figure 7B:
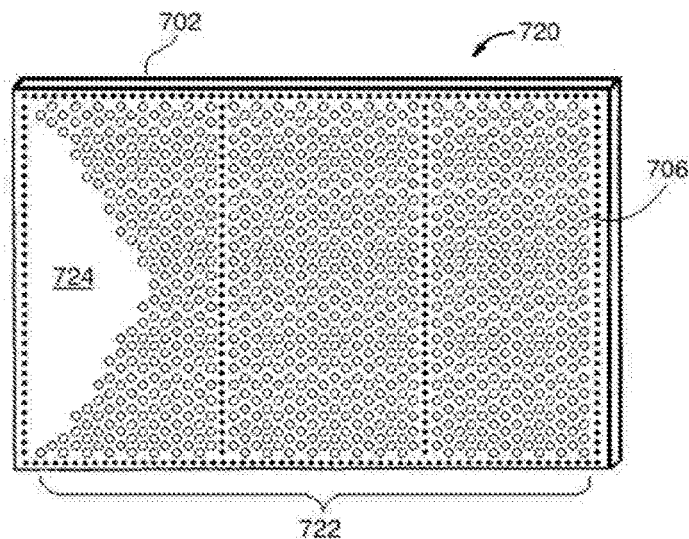
Figure 7C:
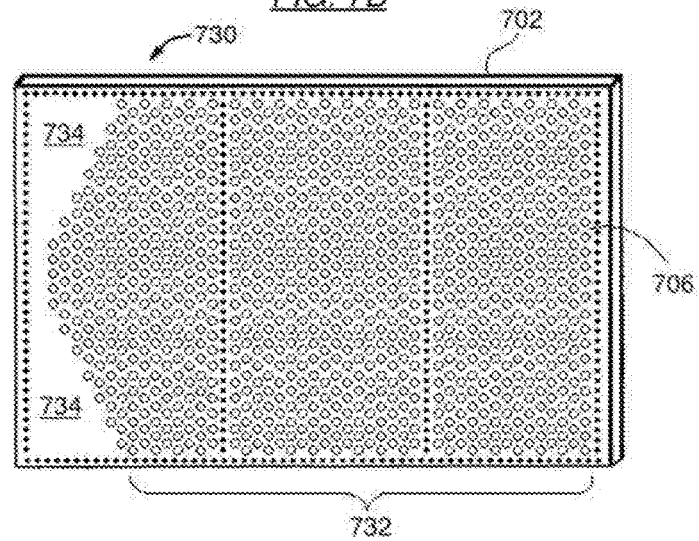

FIGS. 7B and 7C illustrate other embodiments of screen assemblies having perforated and erosion resistant regions with alternate shaped configurations. Screen assemblies 720 and 730 include like features as screen assembly 700, such as a frame 702 having an outer perimeter and at least one inner support member, and a smooth surface 706 affixed to the frame through holes, where the smooth surface includes perforations in a perforated region, and an erosion resistant region. As shown in FIG. 7A, the erosion resistant region 714 is essentially rectangular in shape. However, in some aspects, the shape of the erosion resistant region may be specifically tailored in shape to match the extent of potential for erosion as material is deposited upon the screen. For example, as depicted in FIG. 7B, the erosion resistant region 724 may be convex in shape if the rate of material deposition upon screen assembly 720 is greater nearer the middle of the smooth surface, and thus erosion potential greater at the middle of the smooth surface. The material may be introduced onto the smooth surface 706 at erosion resistant region 724 before conveying across perforated region 722. Alternatively, as shown in FIG. 7C, if the rate of material deposition upon screen assembly 730 is greater nearer the edges of the smooth surface (i.e. erosion potential greater at the edges), the erosion resistant region 734 may be concave in shape, and material may be introduced onto the smooth surface 706 at erosion resistant region 734 before conveying across perforated region 732. While FIGS. 7A through 7C show rectangular, convex and concave shaped erosion resistant regions of smooth surface, these examples are not limiting, and any effective shaped erosion resistant region is within the scope of the disclosure. Further, erosion resistant regions may be regions with or without perforations in the smooth surface.

Figure 8A:
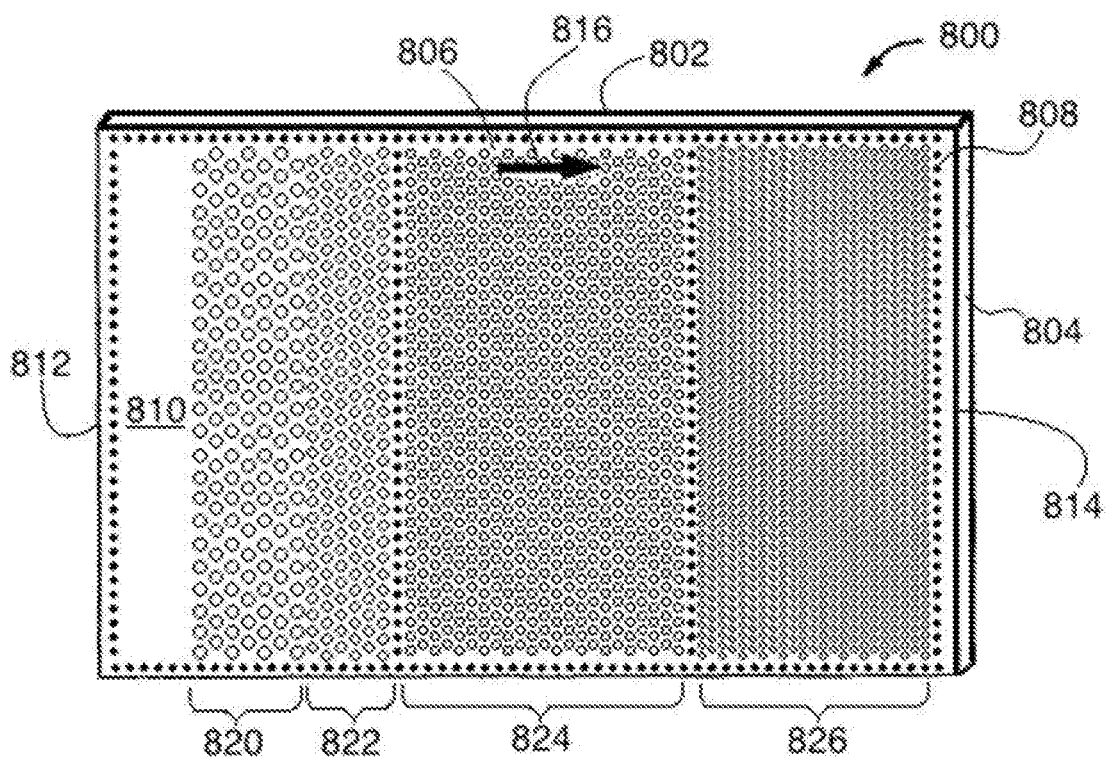
FIGS. 8A and 8B illustrated some screen assemblies according to the disclosure having smooth surfaces with perforations containing apertures having varied density or sizes disposed on the smooth surface, in a top view.
Figure 8B:
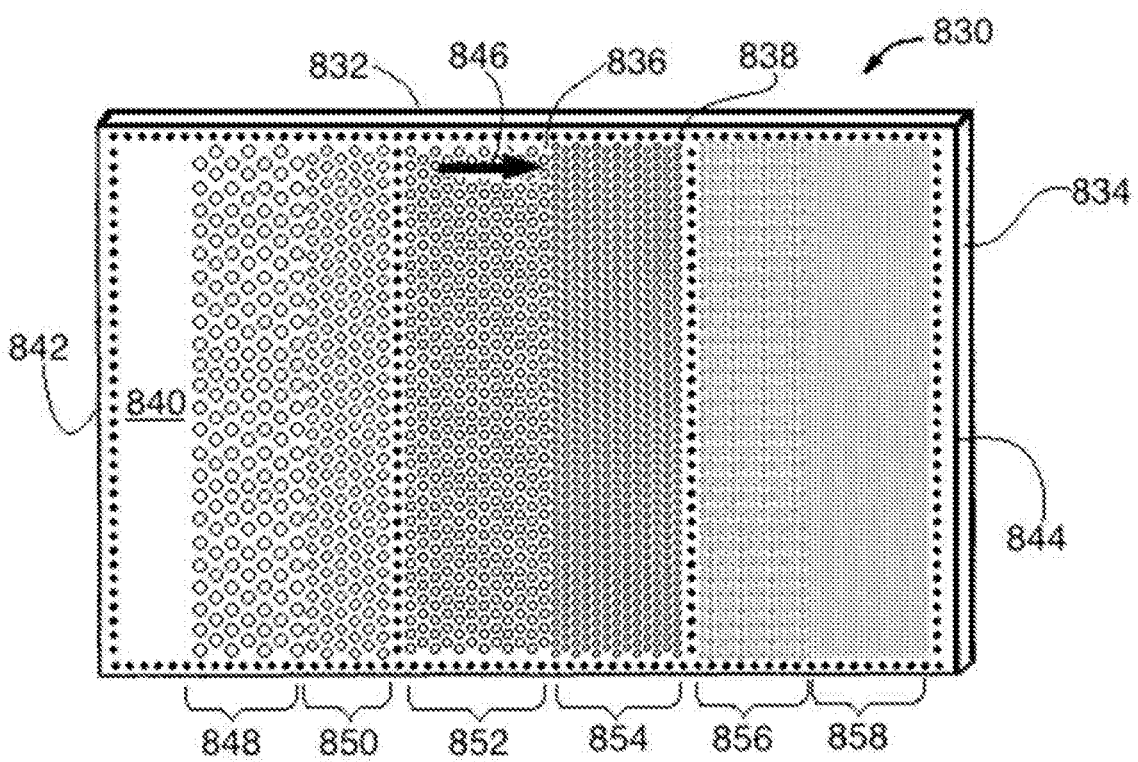

With reference to FIGS. 8A and 8B, some screen assemblies according to the disclosure may have smooth surfaces with perforations comprised of apertures having varied density or sizes disposed on the smooth surface, and in some cases, the apertures are distributed along the perforated smooth surface in a gradient pattern from larger to smaller opening sizes. Screen assemblies 800 and 830 include a frame 802, 832 having an outer perimeter 804, 834 and at least one inner support member (not shown), and a smooth surface 806, 836 affixed to the frame through holes 808, 838. In FIGS. 8A and 8B, optional erosion resistant regions 810, 840 are shown in essentially rectangular shapes, but may be any effective shaped region, and use of varied size and/or density apertures of the perforations in a smooth surface may be used with or without erosion resistant regions. An advantage of using perforated sheets or foils to form the perforated smooth surfaces of screen assemblies is to provide a gradient in aperture size from larger to smaller across the material conveyance direction of the screen assembly. Hence, if material, such as drill cuttings laden fluid is deposited on the smooth surface of screen assemblies 800 and 830 at end 812 and 842, respectively, as the material is conveyed across the smooth surface toward end 814 and 844, the material conveys over gradually decreasing aperture sized perforations. The reverse may also be the case, in some other aspects, where the material conveys over gradually increasing aperture sized perforations. Some benefits of using apertures distributed along the perforated smooth surface in gradient patterns from larger to smaller opening sizes may be fluids with lower solids content overall, after passing along the conveyance path (indicated by arrows 816 and 846 respectively) of the smooth surface, as well as greater range of particle size separated from the fluid.

FIG. 8A depicts a screen assembly with perforations comprised of apertures having four varied sizes disposed on the smooth surface from larger to smaller opening sizes. A first sized region 820 is the largest, and the regions progressively become smaller in size along the conveyance direction, indicated by arrow 816. Hence, the material moves from first sized region 820, to the next smaller sized second region 822, then to the even smaller region 824, and to yet smaller aperture sized region 826. FIG. 8B depicts a screen assembly with perforations comprised of apertures having six varied sizes disposed on the smooth surface from larger to smaller opening sizes. In operation, material moves from first sized region 848, to next smaller sized second region 850, to the next smaller region 852, then to even smaller aperture sized region 854, onto next smaller sized second region 856, and then even smaller aperture sized region 858. The differences in aperture sizes between adjacent regions are not particularly limiting and may be chosen to achieve particular separation size targets given the material properties and process characteristics involved in the operation. In some aspects, the differences in aperture sizes between adjacent regions may decrease in a consecutive fashion, according to API screen number values. For example, in FIG. 8B, first region 848 may be API screen number 25, the second region 850 API screen number 30, the third region 852 API screen number 35, the fourth region 854 API screen number 40, the fifth region 856 API screen number 45, and the sixth region 858 may be API screen number 50. In such a configuration, the apertures' cut point would progress from about 780 μm to about 275 μm from one end of the perforated portion of the smooth surface to the other end. While FIGS. 8A and 8B illustrate a perforated smooth surface where the apertures sizes are varied over four or six regions respectively, any number of varied aperture size regions may be used. In an embodiment, the apertures' size gradually varies over the length of the conveyance direction from a large to small size, in consistently decreasing step down pattern, without specific or defined regions of aperture size.

Figure 9:
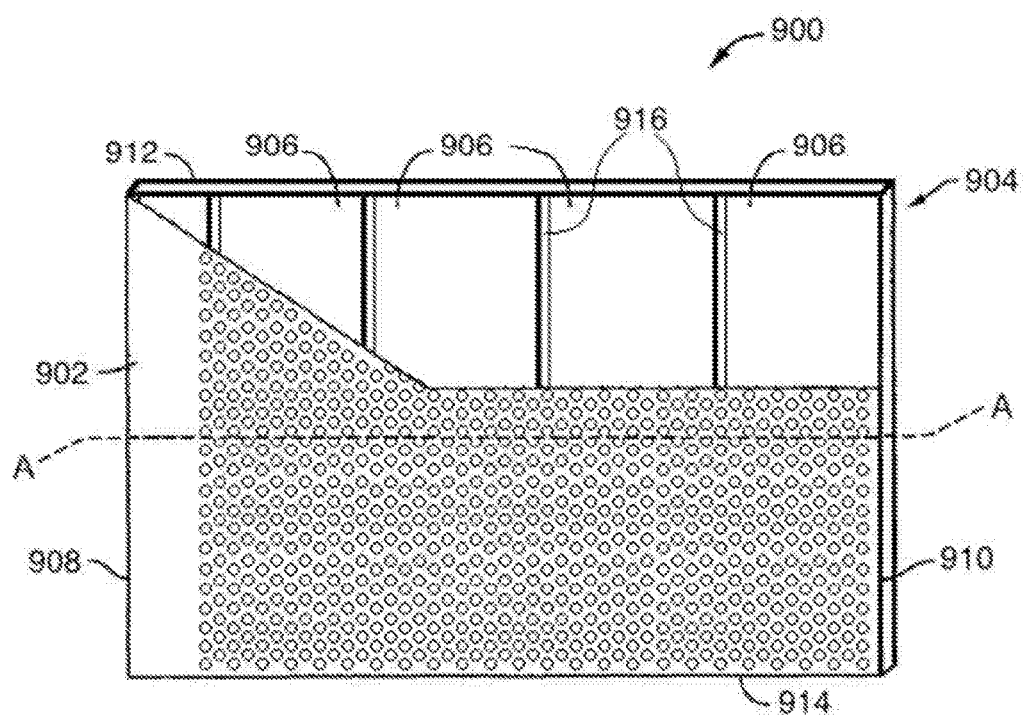
FIG. 9 depicts a top view of a screen assembly affixed to a frame, according to the disclosure, in a top view.

Materials forming frames of screen assemblies according to the disclosure may be metal, composite, other suitable materials or combinations thereof. Also, the overall shape of the frame may be any practical shape known to those of skill in the art. FIG. 9 illustrates a frame shape useful in some embodiments and may be similar to or like those frames disclosed in U.S. Pat. No. 8,393,474. Referring to FIG. 9, a top view of screen assembly 900 is depicted which shows a partially removed (for illustration purposes) perforated smooth surface 902 affixed to frame 904. Perforated smooth surface 902 covers a plurality of openings 906 defined by frame 904 such that solid particles larger than apertures in perforated smooth surface 902 will not pass through screen 900. Frame 904 includes a first side 908 and a second side 910 extending between a first end 912 and a second end 914. In this embodiment, first side 908 and second side 910 are substantially parallel, and first end 912 and second end 914 are also substantially parallel. A plurality of inner support members 916 (four shown) extend between first end 912 and second end 914. Thus, first side 908, second side 910, first end 912, second end 914 and inner support members 916 define openings 906. While the embodiment shown in FIG. 9 illustrates openings 906 of substantially equal configuration (i.e., size and/or shape), one of ordinary skill in the art will appreciate that alternate size and shape openings 906 may be formed by varying the number of inner support members 916 and/or the angles of intersection. Correspondingly, alternate embodiments may include openings 906 which may be substantially asymmetrical, square, circular, triangular, or any other shape known to one of ordinary skill in the art. Furthermore, the relative size of openings 906 may be varied to change the rate of drilling fluid and particulate flow therethrough. Further, screen assembly 900 may include any of the other features described in this disclosure.

Figure 10:
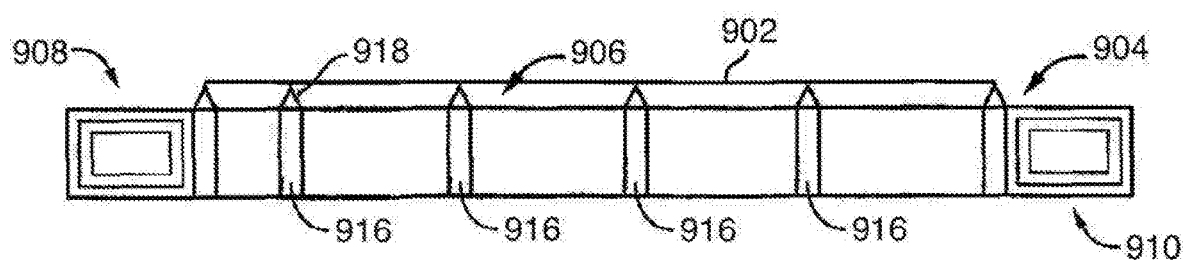
FIG. 10 illustrates a cross-sectional side view of the frame depicted in FIG. 9, in accordance with one frame embodiment of the disclosure.

Referring to FIG. 10, a cross-sectional side view of a frame 904, taken through line A-A of the screen of FIG. 9, is shown in accordance with one frame embodiment of the disclosure. As described above, frame 902 includes a first side 908, a second side 910, and a plurality of inner support members 916. In this embodiment, cross-members 916 include a plurality of contact points 918 for supporting and affixing perforated smooth surface 902. As illustrated, contact points 918 may be of generally pyramidal shape and protrude from cross-members 916 and/or transverse ribs (not shown) if present. Contact points 918 may extend from the top of cross-members 916 and/or optional transverse ribs (not shown) such that a perforated smooth surface 902 may be affixed thereto. To attach the perforated smooth surface 902 to frame 902, the perforated smooth surface 902 may be stretched taut over contact points 918 and then heat and pressure may be applied to contact points 918 to melt and seep through holes in the perforated smooth surface 902. Once contact points 918 melt through the perforated smooth surface 902, contact points 918 may no longer protrude through the perforated smooth surface 902. Thus, by melting and flattening contact points 918, the perforated smooth surface 902 may be attached so as to hold the screen assembly in tension.

Figure 11:
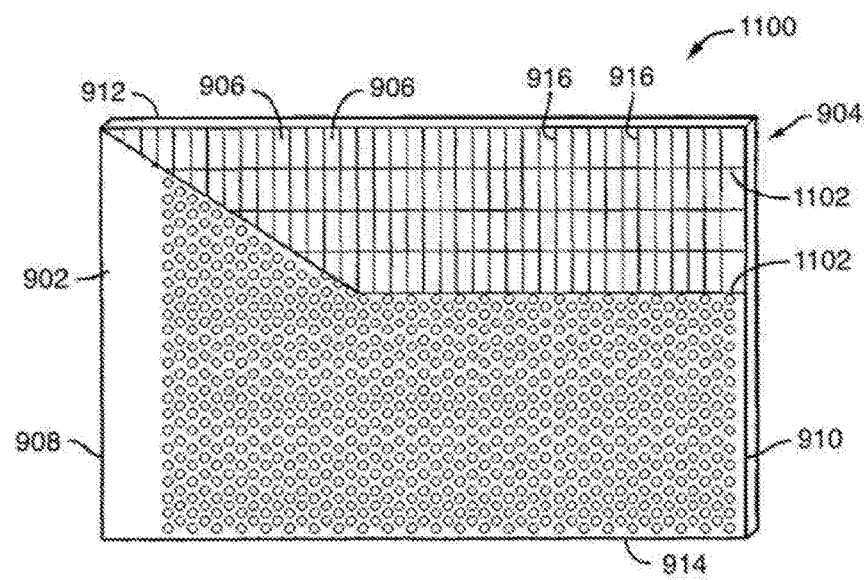
FIG. 11 illustrates another frame design according to some embodiments of the disclosure, in a top view.

FIG. 11 illustrates another frame design according to some embodiments. In FIG. 11, a top view of screen assembly 1100 is shown which includes many like components as screen assembly 900 in FIG. 9, and shows a partially removed (for illustration purposes) perforated smooth surface 902 affixed to frame 904, openings 906 defined by frame 904, and plurality of inner support members 916 (thirty six shown) extending between first end 912 and second end 914 and configured parallel with first side 908 and second side 910. A plurality of transverse ribs 1102 are arrayed between first side 908 and second side 910. Thus, openings 906 are formed from the intersection of transverse ribs 1102 and inner support members 916. While the embodiment shown in FIG. 11 illustrates openings 906 of substantially equal configuration, alternate size and shape openings 906 may be formed by varying the number of inner support members 916 and the angles of intersection between inner support members 916 and transverse ribs 1102, and such openings 906 may be substantially asymmetrical, square, circular, triangular, or any other shape known to one of ordinary skill in the art. Also, the relative size of openings 906 may be varied to change the rate of drilling fluid and particulate flow therethrough. Screen assembly 1100 may include any of the other features described in this disclosure.

Figure 12:
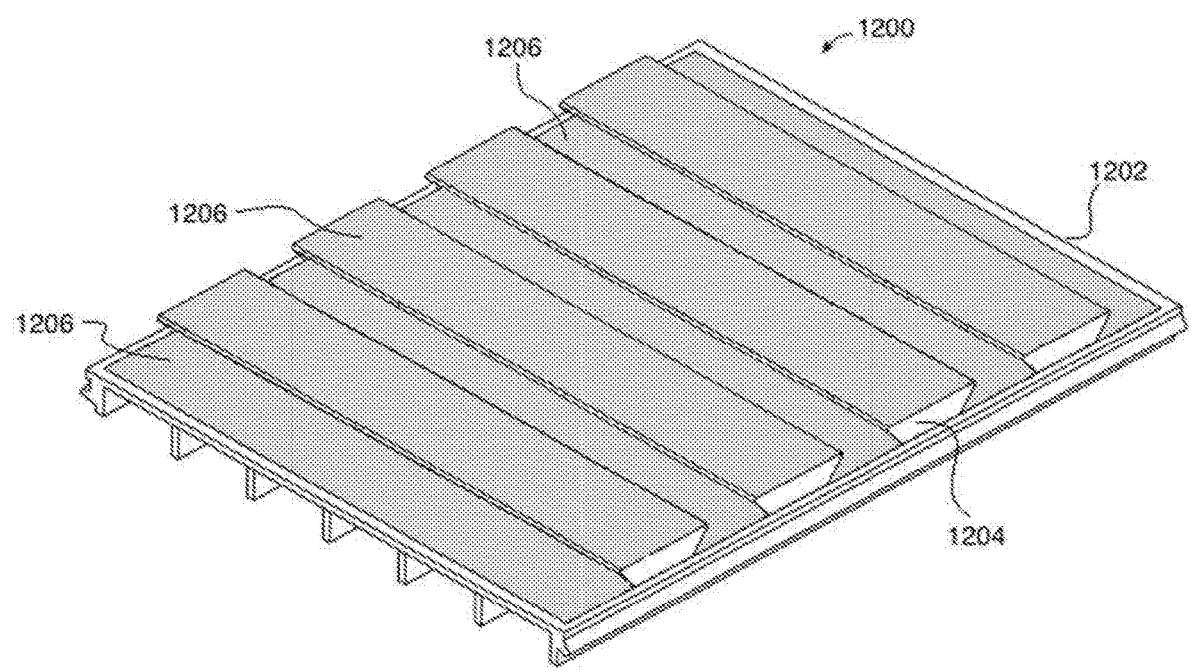
FIG. 12 depicts some embodiments of screen assemblies including a first screen frame, a plurality of second screen frames, in a perspective view.

With reference to FIG. 12, another embodiment of a screen assembly, 1200, includes a first screen frame 1202, a second screen frame(s) 1204 (four shown), and a plurality of perforated smooth surfaces 1206 (nine shown) affixed to first screen frame 1202 a second screen frame(s) 1204, and the overall screen frame design may be similar to or like those disclosed in U.S. Patent Application Publication No. 2014/0183143. The first screen frame 1202 and the second screen frame(s) 1204 may be constructed of metal (e.g., steel, aluminum, etc.), thermoset polymeric, material, thermoplastic polymeric material, a reinforced composite material, or any other suitable material. Accordingly, the first screen frame 1202 and the second screen frame 1204 may be manufactured by three dimensional printing, injection molding, casting, extruding, machining or stamping. While the first screen frame 1202 and the second screen frame 1204 are generally described herein as being discrete and separable components, it will also be appreciated that the first screen frame 1202 and the second screen frame 1204 may be integrally formed as a monolithic construction. Screen assembly 1200 may include any of the other features described in this disclosure.

Figure 13:
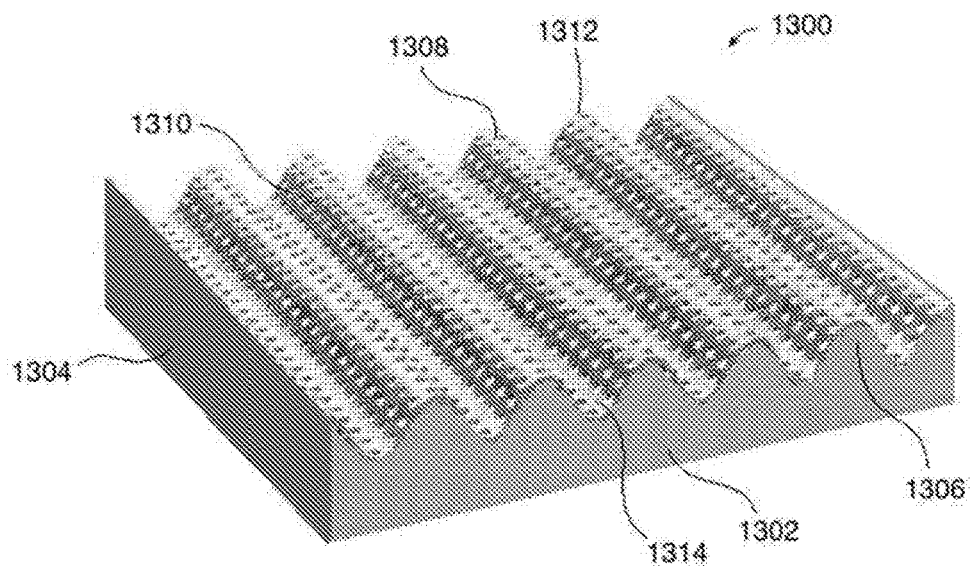
FIG. 13 illustrates an undulated screen assembly in a perspective view, according to some aspects of the disclosure.

In another embodiment of a screen assembly according to the disclosure, an undulated screen assembly 1300 is provided as shown FIG. 13 in a perspective view. Screen assembly 1300 includes a frame 1302 having opposing sides 1302 (one shown), opposing ends 1304 (one shown) and inner support member(s) extending between ends 1304. Frame 1302 may be similar to or like those frames disclosed in U.S. Pat. No. 5,598,930 or U.S. Pat. No. 5,636,749. Sides 1302, which may have so called plugs or raised surfaces 1306 integrated or formed therewith, and ends 1304 are configured to form an undulating support structure. A smooth surface 1308 including perforations 1310 is affixed to an upper surface of frame 1302, to provide a smooth continuous undulated perforated surface. The undulated perforated surface is otherwise corrugated or sinusoidal shape with peaks 1312 and valleys 1314. Further, screen assembly 1300 may include any of the other features described in this disclosure.

Figure 14:
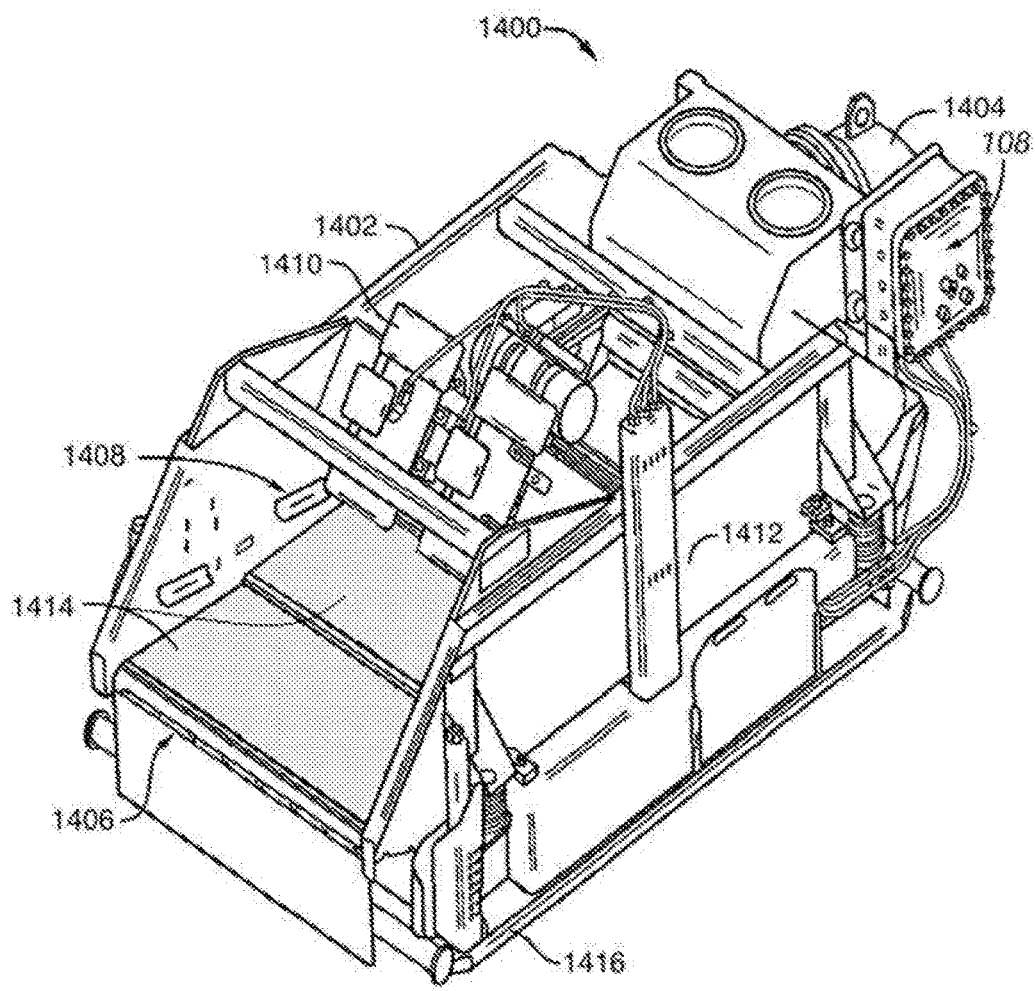
FIG. 14 is a top perspective view of a shale shaker useful with some embodiments of the disclosure; and, FIG. 15 depicts in a side perspective view, a vibratory separator useful with embodiments of the disclosure.
Figure 15:
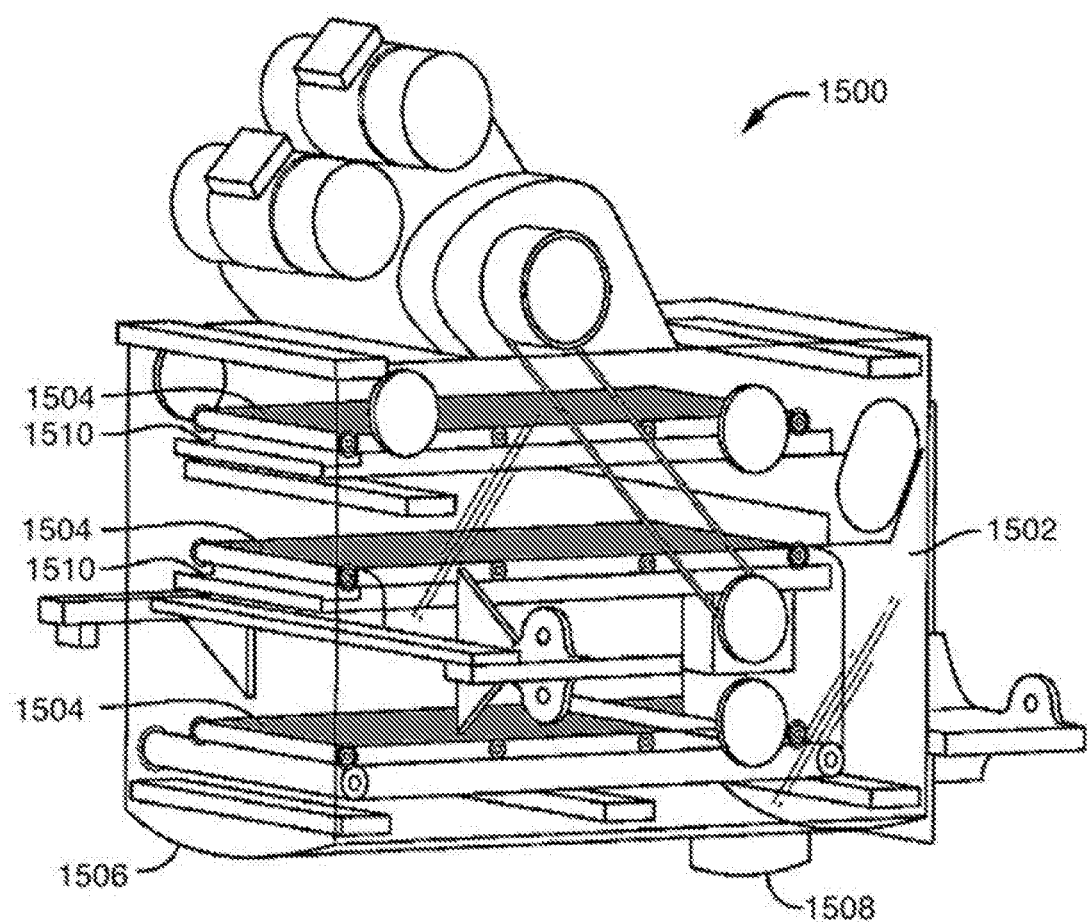

In some embodiments of the disclosure, multiple screen assemblies according to the disclosure, are used with the screens being sequentially arranged in a vibratory screen apparatus, such as the shale shaker 1400 depicted in FIG. 14 or vibratory separator 1500 depicted in FIG. 15. As used in this application, screen assemblies that are "sequential" or that have a "sequential configuration" convey material from one screen assembly to the next screen assembly in the sequence and/or allow material (solid or fluid) to pass through the perforations of one screen assembly and/or over the edges of one screen assembly to the next screen assembly in sequence. A sequential configuration includes but is not limited to 1) screen assemblies positioned one above another, 2) screen assemblies adjacent one another without a substantial step down between them such that material conveys from one screen assembly to the next (e.g., screens can actually butt up against one another), and/or 3) screen assemblies configured in a stepped down configuration such that the conveyed material from one screen assembly falls off the edge of the one screen assembly onto the next screen assembly in the sequence. Also, a screen assembly that is "sequentially after" is a screen assembly in the sequence that receives material (solid or fluid) from another screen assembly in the sequence. A screen assembly that is "sequentially before" is a screen assembly in the sequence that transfers material (solid or fluid) to another screen assembly in the sequence. Obviously if there are more than two screen assemblies in the sequential configuration at least one will be both "sequentially after" another screen assembly and "sequentially before" another screen assembly.

With reference to FIG. 14, a top perspective view of a vibrating screen apparatus in the form of a shale shaker 1400, useful with some embodiments of the disclosure, is shown. Shale shaker 1400 may be similar to or like those vibratory separators disclosed in U.S. Pat. No. 7,909,170. Shale shaker 1400 includes a housing 1402 defining a drilling material inlet 1404, a drilling material discharge area 1406, and an inner section 1408. Shale shaker 1400 also includes at least one actuator 1410 (e.g., a motor, a motor system, or a motor control device). In this embodiment, actuator 1410 imparts a vibratory motion to a basket 1412 that is disposed within housing 1402. Securely attached to basket 1412 is at least one screen assembly 1414 having a perforated smooth surface. Screen assembly 1414 is secured, such that as actuator 1410 is engaged, and vibratory basket 1412 begins to vibrate, screen assembly 1414 will not loosen from basket 1412. Screen assembly 1414 is any screen assembly according to the disclosure. Moreover, screen assembly 1414 may be connected to shale shaker 1400 by any connection type known to one of ordinary skill in the art including, for example, pretension and/or hookstrip assemblies.

Located below screen assembly 1414 is a sump 1416. As drilling material, including liquid state and solid state particulate matter, flows through screen assembly 1414, the drilling material may collect in sump 1416. When sump 1416 becomes full, or at the discretion of the drilling operator, sump 1416 may be emptied through an outlet (not shown). In alternate embodiments, the outlet to sump 1416 may include a valve for retaining drilling waste in sump 1416. Thus, sump 1416 may serve as a means for collecting drilling material that has passed through screen assembly 1414, as well as serving as a storage vessel for separated drilling material prior to downstream processing. Additionally, shale shaker 1400 may also include a programmable logic controller ("PLC") 1418. PLC 1418 may include instructions for running actuators 1410, nozzles, pressurization units, heating units, vibratory sump actuators, or any other process that may require instructions for automation. However, in other embodiments, the nozzles, pressurization units, heating units, sump actuators, and other processes may be controlled manually through the use of, for example, manually valves or control switches.

Now referring to FIG. 15, which depicts in a side perspective view, a vibrating screen apparatus in the form of a vibratory separator 1500, useful with embodiments of the disclosure. Vibratory separator 1500 includes a housing 1502, a plurality of screen assemblies 1504 having perforated smooth surfaces, a sump 1506, and an outlet 1508. In this embodiment, vibratory separator 1500 includes a multi-tier configuration of screen assemblies 1504. By vertically stacking multiple screen assemblies 1504, the footprint of vibratory separator 1500 is decreased, thereby providing equivalent separating potential while requiring less space. In vibratory separators 1500 using vertically stacked screen assemblies 1504, the size of the apertures in the perforated screens may be varied according to each tier. As drilling material begins to flow from a top tier of vibratory separator 1500, the screen assembly apertures may be substantially greater in size than the apertures of lower screen assemblies. To prevent drilling fluid from falling on lower disposed screen assemblies 1504, a series of flowback pans 1510 may be located under screen assemblies 1504. Flowback pans 1510 may be directed to deposit drilling material into sump 1506, thereby allowing drilling material to be substantially cleaner at each level of processing. Vibratory separator 1500 may further include nozzles (not shown) or a fume hood/outlet (not shown) to further assist in cleaning the interior of vibratory separator 1500.

In some aspects, methods may include using a vibrating screen apparatus, such as shale shaker 1400 or vibratory separator 1500, to receive drilling fluid laden with drill cuttings and separate the drill cuttings from the fluid. In one aspect, methods include introducing a drill cuttings laden slurry onto a vibrating screen apparatus, where the vibrating screen apparatus includes a plurality of screens positioned in a sequential configuration, and each of the plurality of screens has a smooth surface with perforations. The perforations include apertures with a shape having one or more corners. The plurality of screens are vibrated to separate drill cuttings and drilling fluid contained in the slurry, such that the drilling fluid separated from the drill cuttings on each screen passes through perforations in a perforated region and the drill cuttings separated are conveyed along the smooth surface of the screen. The drilling cuttings may be further conveyed from a screen that is sequentially before to a screen that is sequentially after for further separating the drilling fluid separated from the drill cuttings.

In some other embodiments, methods include introducing a drill cuttings laden slurry onto a vibrating screen apparatus, where the vibrating screen apparatus includes a plurality of screens positioned in a sequential configuration, and each of the plurality of screens has a frame and smooth perforated surface affixed to the frame. The plurality of screens are vibrated to separate drill cuttings and drilling fluid contained in the slurry, such that the drilling fluid separated from the drill cuttings on each screen passes through perforations in a perforated region and the drill cuttings convey along the smooth surface of the screen. The drilling cuttings may be further conveyed from a screen that is sequentially before to a screen that is sequentially after for further separating the drilling fluid separated from the drill cuttings.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A screen assembly mountable to a basket of a vibratory separator, comprising:
   a frame sized and constructed to fit within the basket of the vibratory separator, the frame comprising
      an outer perimeter formed from a first side, a second side, a first end, and a second end, wherein the first side is opposite the second side, the first end is opposite the second end, and the first end and the second end each extend from the first side to the second side, and
      at least one inner support member extending from the first end to the second end; and
   a filtering surface having an underside affixed to upper surfaces of the frame, wherein the filtering surface comprises
      a perforated region defining perforations of various sizes formed therein, the perforated region extending from the first end to the second end and to the second side, and
      an erosion resistant region without perforations, the erosion resistant region extending from the first side to the perforated region.

2. The screen assembly of claim 1, wherein the filtering surface includes a smooth surface between the perforations.

3. The screen assembly of claim 1, wherein the filtering surface is comprised of a metal material.

4. The screen assembly of claim 1, wherein the perforated region of the filtering surface is a perforated metal foil.

5. The screen assembly of claim 1, wherein the perforations have a shape including one or more corners.

6. The screen assembly of claim 1, wherein the perforations in the perforated region are distributed on the filtering surface in a pattern from relatively larger to relatively smaller sizes.

7. The screen assembly of claim 1, wherein the erosion region is configured to be oriented in a vibratory separator upstream of the perforated region such that the erosion resistant region receives a feed material thereupon prior to the feed material flowing to the perforated region.

* * * * *